United States Patent
Way

(10) Patent No.: US 6,953,252 B2
(45) Date of Patent: Oct. 11, 2005

(54) PROJECTOR HAVING A PLURALITY OF RETRO-REFLECTORS

(75) Inventor: Olan Way, Eugene, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 105 days.

(21) Appl. No.: 10/652,168

(22) Filed: Aug. 28, 2003

(65) Prior Publication Data

US 2005/0046809 A1 Mar. 3, 2005

(51) Int. Cl.[7] .................. G03B 21/00; G03B 21/28; G02F 1/1335; G02B 5/10; F21V 7/00
(52) U.S. Cl. .................. 353/99; 353/122; 349/5; 359/858; 362/297
(58) Field of Search .................. 353/30, 85, 98, 353/99, 121, 122; 349/5; 359/858; 362/32, 297; 313/313, 113; 348/744, 783

(56) References Cited

U.S. PATENT DOCUMENTS

| | | | | |
|---|---|---|---|---|
| 5,842,767 A | * | 12/1998 | Rizkin et al. | 362/21 |
| 6,227,682 B1 | * | 5/2001 | Li | 362/302 |
| 6,332,688 B1 | | 12/2001 | Magarill | 359/858 |
| 6,356,700 B1 | | 3/2002 | Strobl | 385/147 |
| 6,830,340 B2 | * | 12/2004 | Olson et al. | 353/30 |

* cited by examiner

Primary Examiner—Melissa J Koval

(57) ABSTRACT

A projector having a plurality of retro-reflectors. In one embodiment of the present invention, a projector includes a light source, an image forming device, a concave reflector, and a plurality of retro-reflectors. The concave reflector is positioned adjacent to the light source to reflect light emitted by the light source toward the image forming device. The plurality of retro-reflectors is configured to reflect light emitted from the light source toward the concave reflector and is positioned as sets at different respective distances from the light source.

25 Claims, 5 Drawing Sheets

PROJECTOR HAVING A PLURALITY OF RETRO-REFLECTORS

TECHNICAL FIELD

The present invention generally relates to the field of projectors and more particularly to a projector having a plurality of retro-reflectors.

BACKGROUND

Projectors are utilized in many aspects of modern life. From home theaters to business presentations, projectors are provided to offer a wide range of functionality to consumers. For example, a projector may provide a display of a slide show on a screen, a display of a movie in a home theater setting, and so on.

Projectors may be configured in a variety of ways to provide desired functionality. For example, a consumer may carry a mobile projector to provide a slideshow presentation. The mobile projector may be configured to have a reduced size and weight so that the projector may be more easily carried. Even in non-mobile applications, a reduced size and weight is still desirable. For example, a projector may be configured for use in home theater setting to provide an output of movies and television programs. To provide the output, the projector may be mounted to the ceiling in the home theater setting for a display of the output on a screen. A projector having a reduced size and weight may appear less obtrusive and therefore more desirable even when mounted to the ceiling.

Projectors may also be configured to provide an amount of light for a contemplated setting. For instance, projectors may be utilized to provide a display on a screen. The brightness of the display decreases as the size of the display increases and the distance between the screen and the projector increases. To provide an output that has a sufficient brightness for a desired application, the projector includes a light source that outputs a sufficient amount of light for the desired application. The light source, however, may utilize a significant amount of space in the projector due to the size of the light source itself as well as the size of any cooling device that may be utilized to protect the projector from heat generated by the light source. Thus, the amount of light output by the projector may be limited by the size of the projector.

Therefore, it would be an advance in the art to provide a projector having a reduced size and/or increased light output.

BRIEF DESCRIPTION OF THE DRAWINGS

The same reference numbers are used throughout the drawings to reference like features and components.

DETAILED DESCRIPTION

Overview

A projector having a plurality of retro-reflectors is described. In one embodiment of the present invention, a projector includes a light source, an image forming device, a concave reflector, and a plurality of retro-reflectors. The concave reflector is configured to reflect light emitted by the light source toward the image forming device. The plurality of retro-reflectors is configured to reflect light emitted from the light source toward the concave reflector. Each of the plurality of retro-reflectors is positioned at different respective distances from the light source.

In an additional embodiment of the present invention, a method includes emitting light from a light source in a projector. The projector includes the light source, an image forming device, a concave reflector that is positioned adjacent to the light source, and a plurality of retro-reflectors that are positioned at different respective distances from the light source. A first portion of the emitted light is reflected by the concave reflector toward the image forming device. A second portion of the emitted light is reflected by the plurality of retro-reflectors toward the concave reflector. The reflected second portion of the emitted light is reflected by the concave reflector toward the image forming device.

FIGS. 1 through 6 illustrate exemplary embodiments of projectors having a plurality of retro-reflectors. The-projectors in each embodiment of the present invention may be configured for use in a variety of settings, such as a front-projector in a home theater for display of a television program, as a mobile projector for display of a slide-show presentation in an office, as a movie projector for display of a movie in a movie theater, as a projector that is included in a rear-projection television, and so on.

Figure 1:
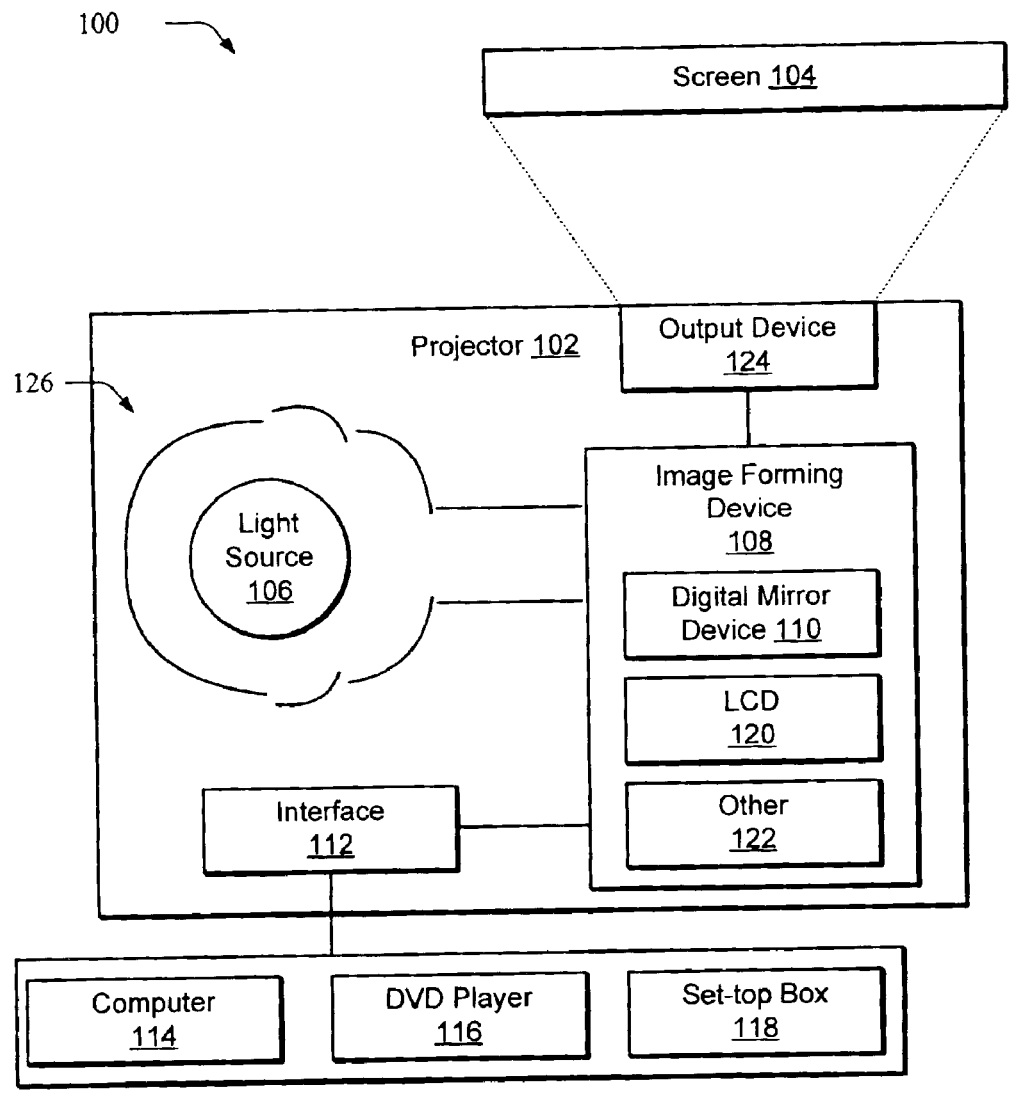
FIG. 1 is an illustration of an exemplary embodiment of the present invention that shows a projection system that includes a projector that provides an output for display on a screen.

FIG. 1 is an illustration of an exemplary embodiment of the present invention that shows a projection system 100 that includes a projector 102 that provides an output for display on a screen 104. The projector 102 includes a light source 106 that supplies light that is used to provide the output of the projector 102. The light source 106 may be configured in a variety of ways, such as an arc halogen discharge lamp. Arc halogen discharge lamps do not contain a filament to emit light but rather ionize a gaseous vapor though a high-energy arc discharge between two electrodes. Other light sources may also be utilized, such as incandescent light bulb, fluorescent device, white-light emitting diodes, and so forth.

Light from the light source 106 is directed toward an image forming device 108. The image forming device 108 provides an image using the light from the light source 106. To provide the image, the image forming device 108 may include a variety of components. In one embodiment, the image forming device 108 is configured to perform digital light processing through the use of a digital mirror device 110. The digital mirror device 110 includes a multitude of mirrors that are mounted onto a substrate. The mirrors of the digital mirror device 110 may be rotated individually, which causes each of the mirrors to either reflect or not reflect light from the light source 106.

If a single digital mirror device 110 is utilized, red, green and blue (RGB) portions of an image are shown in sequence to supply a colored image. For example, a color wheel that has red, green and blue (RGB) segments may be utilized to supply the colors. The color wheel is placed between light source 106 and the digital mirror device 110 and spun to provide red, green or blue light depending on which segment of the color wheel is placed in a pathway of light that is output from the light source 106 to the digital mirror device 110. Configuration of the mirrors on the digital mirror device 110 is synchronized with the placement of the segments of the color wheel in the light path to provide sequential red, green and blue images. By supplying the sequential images in rapid sequence, a full color image is perceived by the human eye. In another embodiment, multiple digital mirror devices are utilized to form an image. For example, separate digital mirror devices may be utilized to provide respective outputs of red, green and blue. Light reflected from each of the separate digital mirror devices is combined to display a full color image.

The mirrors of the digital mirror device 110 may be configured in response to an input received from an interface 112. The input may be supplied to the interface 112 from a variety of devices, such as through a computer 114, a DVD player 116, a set-top box 118, and so forth. For example, the computer 114 may provide an input that causes a slide show to be displayed by the image forming device 108.

In another embodiment of the present invention, the image forming device 108 is configured to include a liquid-crystal display (LCD) 120. For example, the LCD 120 may include a stationary mirror. Light from the light source 106 is transmitted through the LCD 120 and reflected from the stationary mirror to provide an image. The LCD 120 is utilized to control the light reflected from the stationary mirror by controlling transmission of red, green and/or blue light at each pixel of the LCD 120. Like the mirrors of the digital mirror device 110, each pixel of the LCD 120 may be configured in response to input received from the interface 112. Although an image forming device 108 including a digital mirror device 110 and/or an LCD 120 is described, other components 122 may also be utilized in the image forming device 108 to form an image, such as a grating light valve (GLV) or a liquid crystal on silicon (LCOS) device. Although the illustrated projector 102 shows a separate image forming device 108 and a separate light source 106, components may be added, combined and/or deleted in various embodiments.

Light that is transmitted by the image forming device 108 is output using an output device 124, such as a lens, one or more mirrors, and so on. Light output by the output device 124 is then displayed on the screen 104 for viewing an image that is projection on the screen 104 by the projector 102. To increase the amount of light that is available to the image forming device 108, a reflector assembly 126 is positioned adjacent to the light source 106. The reflector assembly 126 includes reflectors that reflect light toward the image forming device 108. The reflectors reflect light that otherwise would not have been supplied to the image forming device 108, and would be thereby wasted. In this way, a greater portion of light that is emitted by the light source 106 is utilized by the image forming device 108 through use of the reflector assembly 126.

Figure 2:
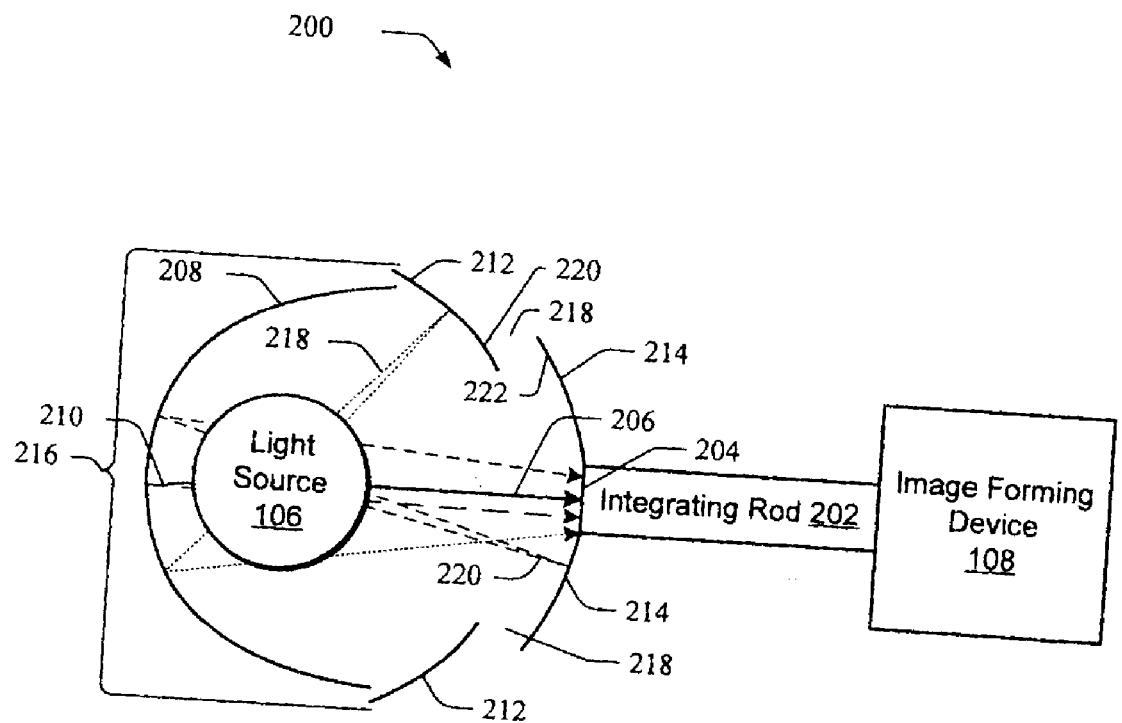
FIG. 2 is an illustration of an exemplary embodiment of the present invention showing a cross-section taken from the projector of FIG. 1 along an axis of light emitted from a light source to an image forming device.

FIG. 2 is an illustration of an exemplary embodiment 200 of the present invention showing a cross-section taken from the projector 102 of FIG. 1 along an axis of light emitted from the light source 106 to the image forming device 108. The image forming device 108 may include an integrating rod 202 having a surface 204 that is disposed to receive light from the light source 106. The integrating rod 202 is utilized to minimize the loss of light as it is propagated from the light source 106. For instance, the integrating rod 202 may propagate light from the surface 204 to components of the image forming device 108 that form the image, such as the digital mirror device 110 and/or LCD 120 shown in FIG. 1.

The light source 106 may omnidirectionally emit light such that light waves are emitted at each of the outward directions from the light source 106. Because of the omni-directional emission, just a portion of the emitted light is directed toward the image forming device 108. This portion of light is illustrated in FIG. 2 as a light wave 206 emitted from the light source 106 toward the image forming device 108. To direct portions of the emitted light that are not directed at the image forming device 108 by the light source 106, the reflector assembly 126 may be utilized. The reflector assembly 126 reflects light toward the image forming device 108 so that a greater portion of the light emitted by the light source 106 may be utilized by the image forming device 108.

The reflector assembly 126 includes a concave reflector 208 that is configured to reflect light that is emitted by the light source 106 toward the surface 204 of the integrating rod 202. The concave reflector 208 may be configured in a variety of ways, such as ellipsoidal, paraboloidal, cylindrical, hyperbolic, and so forth. For example, the concave reflector 208 may be ellipsoidal such that light emitted by the light source 106 is reflected by the concave reflector 208 toward the surface 204 of the integrating rod 202. The concave reflector 208 has first and second focal points. The light source 106 is positioned at or near the first focal point and the surface 204 of the integrating rod 202 is positioned at or near the second focal point of the concave reflector 208. The concave reflector 208 focuses light emitted by the light source 106 at the first focal point toward the surface 204 of the integrating rod 202 that is positioned at the second focal point. In this way, a significant portion of light that is reflected by the concave reflector 208 is reflected toward the image forming device 108. For example, a light wave 210 emitted toward the concave reflector 208 is reflected by the concave reflector 208 toward the surface 204 of the integrating rod 202.

Even though the concave reflector 208 may be configured to reflect a significant portion of light from the light source 106 toward the image forming device 108, there is still a portion of light that is emitted by the light source 106 that is not directed toward the surface 204 of the integrating rod 202—either directly by the light source 106 or by reflection from the concave reflector 208. The reflector assembly 126, therefore, includes a plurality of retro-reflectors 212, 214 that reflect light emitted by the light source 106 that is not emitted by the light source 106 or reflected by the concave reflector 208 toward the surface 204 of the integrating rod 202.

The plurality of retro-reflectors 212, 214 are configured to reflect light emitted by the light source 106 toward the concave reflector 208 such that the concave reflector 208 then reflects the light toward the surface 204 of the integrating rod 202. For example, to take advantage of the shape, i.e. ellipsoidal, of the convex reflector 208, the plurality of retro-reflectors 212, 214 are configured to reflect light emitted by the light source 106 toward the light source 106. Thus, light waves 218, 220 reflected by the plurality of retro-reflectors 212, 214 pass near the first focal point of the convex reflector 208. As previously stated, light from the first focal point is focused by the convex reflector 208 at the second focal point of the convex reflector 208. In this embodiment, the surface 204 of the integrating rod 202 is positioned at the second focal point. Thus, the combination of the plurality of retro-reflectors 212, 214 and the convex reflector 208 reflect light that is not directed at the surface 204 of the integrating rod 202 by the light source 106 toward the surface 204 of the integrating rod 202.

The plurality of retro-reflectors 212, 214 is configured to reduce the amount of space 216 used by the reflector assembly 126 by positioning the retro-reflectors at different respective distances from the light source 106. For example, the plurality of retro-reflectors 212, 214 include a first set of retro-reflectors 212 that are positioned at a first distance from the light source 106 and a second set of retro-reflectors 214 that are positioned at a second distance from the light source 106. The second distance is greater than the first distance. By placing the plurality of retro-reflectors 212, 214 at different respective distances, the amount of space 216 that is utilized by the plurality of retro-reflectors 212, 214 is reduced while still providing cooling for the light source 106. For instance, the light source 106 may generate a significant amount of heat. The first and second sets of retro-reflectors 212, 214 are positioned at the respective first and second distances to provide spaces 218 for the heat to escape. In this way, heat from the light source 106 may escape and the amount of space 216 utilized by the plurality of retro-reflectors 212, 214 is not increased to provide the space for heat to escape. In this instance, the amount of space 216 may be defined as the distance from an axis of light that is emitted from the light source 106 directly toward the image forming device 108. The axis of light is illustrated by as the light wave 206 that is emitted from the light source 106 toward the image forming device 108. The plurality of retro-reflectors 212, 214 is formed to overlap such that at least two portions 220, 222 of respective at least two of the plurality of retro-reflectors 212, 214 are positioned at substantially similar distances from the axis defined by light that is output by the light source 106 toward the image forming device 108. By overlapping the plurality of retro-reflectors 212, 214, the distance from the axis may be reduced, thereby reducing the amount of space 216 utilized by the plurality of retro-reflectors 212, 214.

The first set of retro-reflectors 212 each have a curvature that corresponds to the first distance such that light reflected from the first set of retro-reflectors 212 is directed at the light source 106. Likewise, second set of retro-reflectors 214 each have a curvature that corresponds to the second distance such that light reflected from the second set of retro-reflectors 214 is directed at the light source 106. In other words, both the first and second set of retro-reflectors have curvatures that focus light reflected by the respective first and second sets of reflectors 212, 214 at or near the light source 106, which is positioned at the first focal point of the concave reflector 208. Thus, the curvatures of the respective first and second sets of retro-reflectors 212, 214 are different because of the differences in the first and second distances. In other words, the first and second sets of retro-reflectors 212, 214 may have different respective radii from the light source 106. For example, in an embodiment of the present invention, each of the plurality of retro-reflectors is configured as a spherical retro-reflector, i.e. has a surface that is an equal distance from the light source 106, such that light emitted by the light source 106 is reflected by each retro-reflector at or near the light source 106.

The concave reflector 208 and the plurality of retro-reflectors 212, 214 as shown in FIG. 2 are configured such that a significant portion of the light is reflected two times or less before impacting the surface 204 of the integrating rod 202. For instance, light 218, 220 is reflected by the plurality of retro-reflectors 212, 214 toward the concave reflector 208, which is then reflected toward the surface 204 of the integrating rod 202. Light 210 that is emitted by the light source 106 toward the concave reflector 208 is reflected once before impacting the surface 204 of the integrating rod 202. In additional embodiments of the present invention, light may be reflected more than two times.

Figure 3:
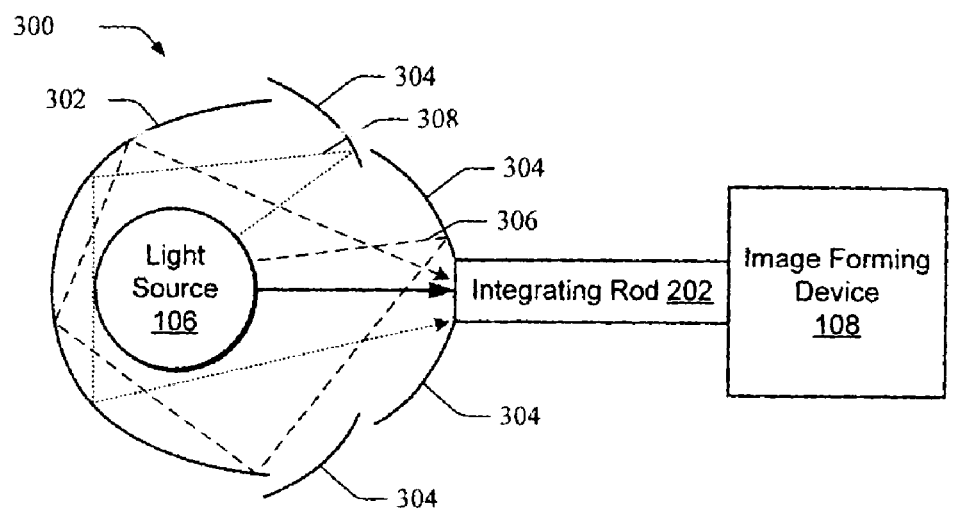
FIG. 3 is an illustration showing an exemplary embodiment of the present invention wherein a reflector assembly is configured to reflect light multiple times.

FIG. 3 is an illustration showing an exemplary embodiment 300 of the present invention wherein a reflector assembly is configured to reflect light multiple times. The reflector assembly includes a concave reflector 302 and a plurality of retro-reflectors 304. In this embodiment, light 306, 308 reflected by the plurality of retro-reflectors 304 is directed toward the concave reflector, but is not directed at or near the light source 106. For example, in one embodiment, the light source 106 may be configured of a size and/or transparency such that a signification portion of the light is not transmitted through the light source 106. In another embodiment, a greater portion of light may be available when reflected three or more times as opposed to the amount of light that is available when transmitted through the light source 106 and reflected two or less times. Therefore, in such embodiments, the concave reflector 302 and the plurality of retro-reflectors 304 may be configured to reflect light three or more times, without directing the light at or near the light source 106.

Figure 4:
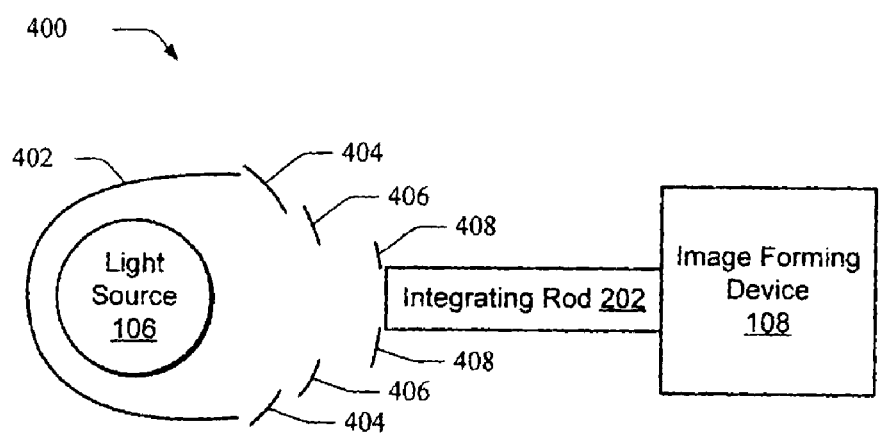
FIG. 4 is an illustration of an exemplary embodiment of the present invention wherein sets of retro-reflectors are positioned at three different distances from a light source.

Although the previous exemplary embodiments described retro-reflectors at first and second distances from the light source 106, the retro-reflectors may be configured in a variety of ways. For example, FIG. 4 is an illustration of an exemplary embodiment 400 of the present invention wherein sets of retro-reflectors are positioned at three different distances from the light source 106. A reflector assembly includes a concave reflector 402 as previously described. The reflector assembly also includes first, second, and third sets of retro-reflectors 404, 406, 408 that are positioned, respectively, at first, second and third distances from the light source 106. The sets of retro-reflectors 404, 406, 408 may be configured such that light that is reflected by the sets of retro-reflectors 404, 406, 408 is reflected at least two times as previously described.

Figure 5:
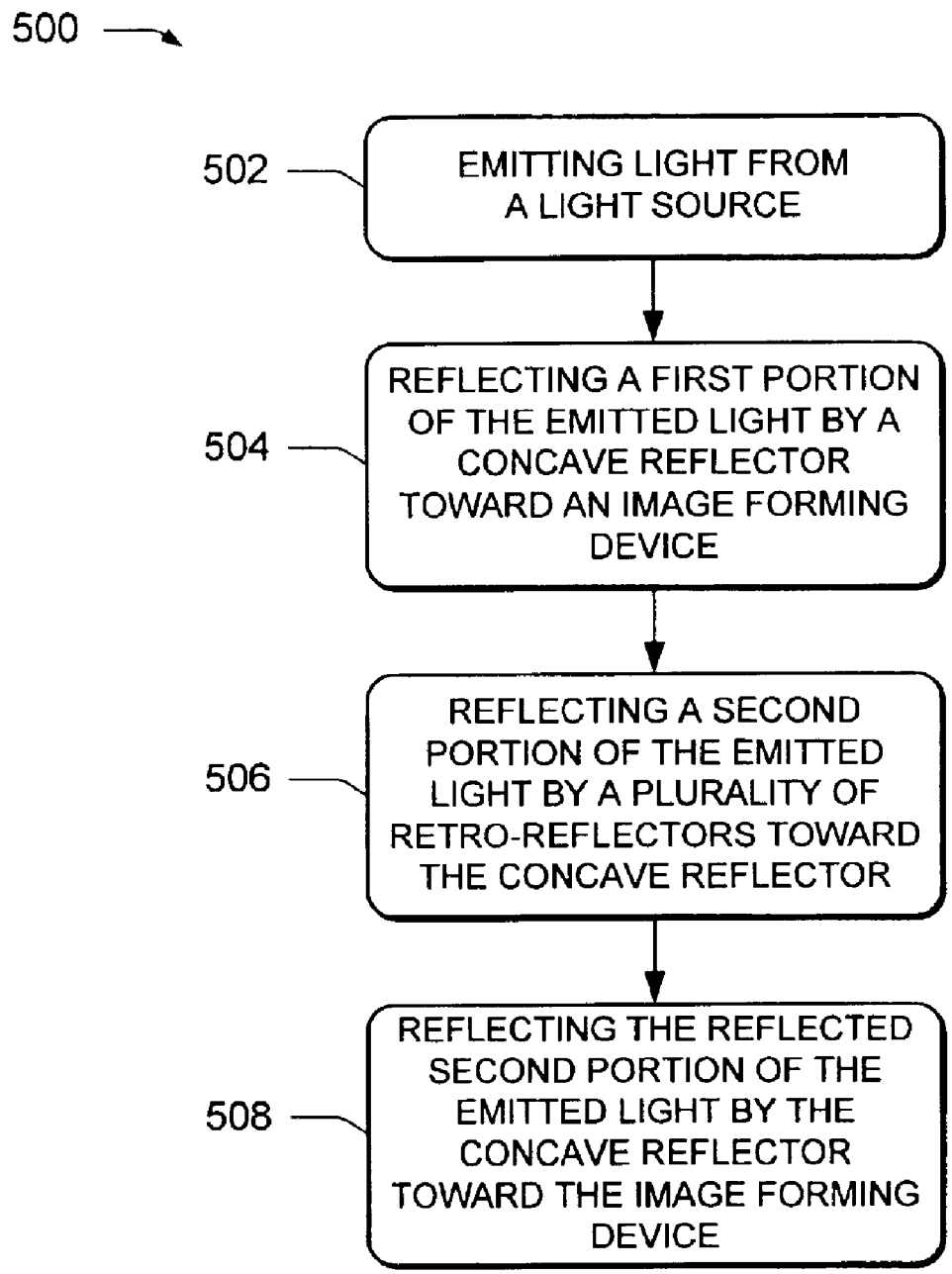
FIG. 5 is a flow chart depicting a procedure in an exemplary embodiment of the present invention wherein light emitted by a light source that otherwise would not have been directed toward an image forming device is reflected toward the image forming device by a concave reflector and/or a retro-reflector.

FIG. 5 is a flow chart depicting a procedure in an exemplary embodiment 500 of the present invention wherein light emitted by a light source that otherwise would not have been directed toward an image forming device is reflected toward the image forming device by a concave reflector and/or a retro-reflector. As previously stated, a projector may include a light source, an image forming device, a concave reflector, and a plurality or retro-reflectors. The concave reflector is positioned adjacent to the light source. The plurality of retro-reflectors is positioned at different respective distances from the light source.

At block 502, light is emitted from the light source. At block 504, a first portion of the emitted light is reflected by the concave reflector toward the image forming device. At block 506, a second portion of the emitted light is reflected by the plurality of retro-reflectors toward the concave reflector. At block 508, the reflected second portion of the emitted light is reflected by the concave reflector toward the image forming device.

Figure 6:
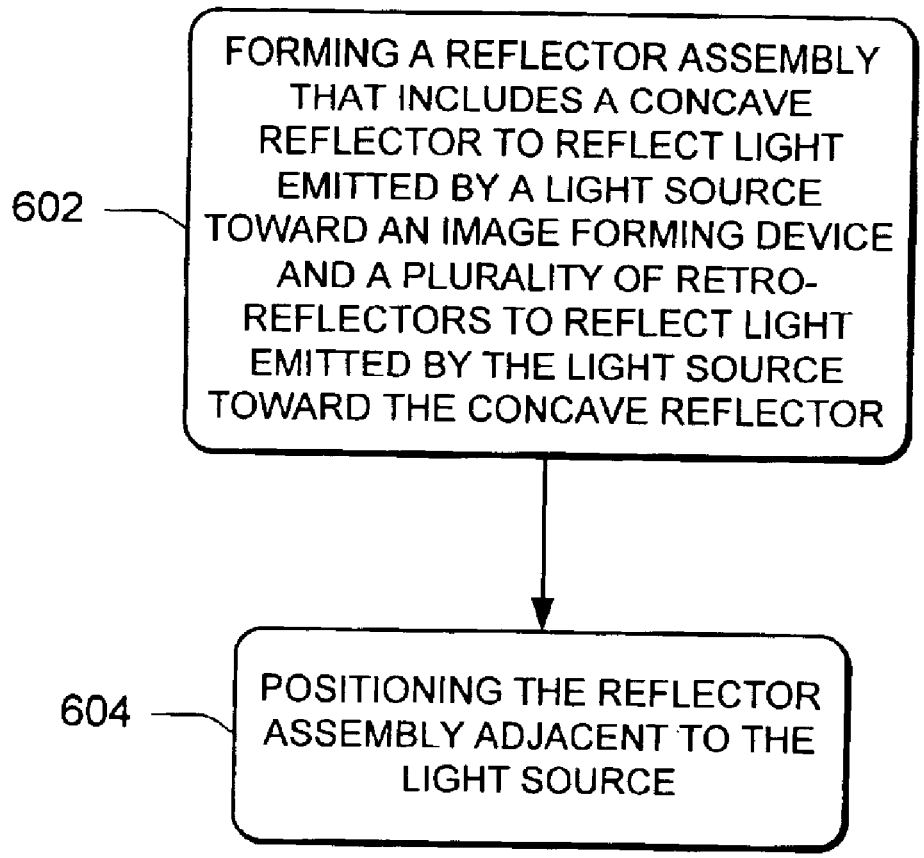
FIG. 6 is a flow chart depicting a procedure in an exemplary embodiment of the present invention wherein a projector is produced that includes a concave reflector and a plurality of retro-reflectors.

FIG. 6 is a flow chart depicting a procedure in an exemplary embodiment 600 of the present invention wherein a projector is produced that includes a concave reflector and a plurality of retro-reflectors. At block 602, a reflector assembly is formed. The reflector assembly includes a concave reflector and a plurality of retro-reflectors. The concave reflector is configured to reflect light emitted by a light source toward an image forming device. For example, the concave reflector may be ellipsoidal such that the concave reflector has first and second focal points. The plurality of retro-reflectors is configured to reflect light emitted from the light source at the concave reflector. For instance, the plurality of retro-reflectors may be formed to take advantage of the structure of the concave reflector such that light emitted by the light source toward the plurality of retro-reflectors is reflected toward the light source such that the reflected light passes at or near the first focal point. The reflected light is therefore reflected by the concave reflector toward the image forming device.

A reflector assembly having the concave reflector and the plurality of retro-reflectors may be formed in a variety of ways. In one embodiment, a plastic structure is molded and then coated with metal to provide reflective surfaces. In another embodiment, metal is molded and then polished to provide reflective surfaces that correspond to the concave reflector and the plurality of retro-reflections. In a further embodiment, the concave reflector and the plurality of retro-reflectors are machined. A variety of other manufacturing techniques may also be utilized to form the reflector assembly.

The reflector assembly may be configured as a single unit that includes both the concave reflector and the plurality of reflectors, as separate units that are positioned to provide the described reflection, and so on. For example, the concave reflector may be configured as multiple segments. Additionally, each of the plurality of retro-reflectors may be provided as separate segments. Each of the segments of the concave reflector and the plurality of retro-reflectors may then be assembly to form the reflector assembly.

At block 604, the reflector assembly is positioned adjacent to the light source. The concave reflector, for instance, may be positioned such that the light source is at or near the first focal point of the concave reflector. The image forming device may be positioned at the second focal point. Therefore, light emitted by the light source toward the concave reflector is reflected towards the image forming device.

Although the invention has been described in language specific to structural features and methodological steps, it is to be understood that the invention defined in the appended claims is not necessarily limited to the specific features or steps described. Rather, the specific features and steps are disclosed as preferred forms of implementing the claimed invention.

What is claimed is:

1. A projector comprising:
    a light source;
    an image forming device;
    a concave reflector to reflect light emitted by the light source toward the image forming device; and
    a plurality of retro-reflectors to reflect light emitted from the light source toward the concave reflector including sets of one or more retro-reflectors wherein each said of retro-reflectors is positioned at different respective distances from the light source; and
    wherein at least two sets of retro-reflectors are spaced apart from the concave reflector.

2. A projector as described in claim 1, wherein:
    the concave reflector is ellipsoidal; and
    each of the plurality of retro-reflectors is spherical such that light emitted by the light source toward the plurality of retro-reflectors is reflected toward the light source.

3. A projector as described in claim 2, wherein
    the concave reflector includes first and second focal points; and
    the light source and the image forming device are positioned at the first and second focal points, respectively.

4. A projector as described in claim 1, wherein the plurality of retro-reflectors are configured to reflect light emitted from the light source toward the concave reflector such that light reflected by the plurality of retro-reflectors is reflected by the concave reflector toward the image forming device.

5. A projector as described in claim 1, wherein the light source is positioned:
    between the concave reflector and the plurality of retro-reflectors; and
    between the concave reflector and the image forming device.

6. A projector as described in claim 1, wherein the image forming device includes a component selected from the group consisting of:
    a digital micromirror device (DMD);
    a grating light valve (GLV);
    a liquid crystal on silicon (LCOS) device; and
    a liquid crystal display (LCD).

7. A projector as described in claim 1, wherein the retro-reflectors in each set are concave and have different respective curvatures, one set to another.

8. A projector as described in claim 1, wherein the plurality of retro-reflectors are configured to reflect light that is emitted by the light source toward the concave surface that is not first reflected by the concave surface toward the image forming device.

9. A projector as described in claim 1, wherein the image forming device further comprises an integrating rod into which light is directed by the concave reflector.

10. A projector as described in claim 1, further comprising an interface that is communicatively coupled to the image forming device to provide an input to initiate image formation by the image forming device.

11. A method comprising:
    in a projector including a light source, an image forming device, a concave reflector that is positioned adjacent to the light source, and a plurality of retro-reflectors including at least two sets of one or more retro-reflectors that are positioned at different respective distances from the light source, wherein the at least two sets are spaced apart from the concave reflector,
    emitting light from the light source;
    reflecting a first portion of the emitted light by the concave reflector toward the image forming device;
    reflecting a second portion of the emitted light by the plurality of retro-reflectors toward the concave reflector; and
    reflecting the reflected second portion of the emitted light by the concave reflector toward the image forming device.

12. A method as described in claim 11, wherein the reflecting of the second portion of the emitted light is directed at or near the light source.

13. A method as described in claim 11, further comprising forming an image by the image forming device from light that is selected from the group consisting of:
light emitted from the light source;
the first portion of the emitted light;
the reflected second portion of the emitted light; and
a combination thereof.

14. A method as described in claim 11, further comprising forming an image by the image forming device in response to an input that is received from a device selected from the group consisting of:
a computer;
a DVD player; and
a set-top box.

15. A method comprising:
forming a reflector assembly that includes:
a concave reflector to reflect light emitted by a light source toward an image forming device; and
a plurality of retro-reflector to reflect light emitted from the light source toward the concave reflector including set of one or more retro-reflectors, wherein the sets of retro-reflectors are positioned at different respective distances from the light source and at least two sets are spaced apart from the concave reflector, and
positioning the reflector assembly adjacent to the light.

16. A method as described in claim 15, wherein
the concave reflector is ellipsoidal and includes first and second focal points; and
the light source and the image forming device are positioned at the first and second focal points, respectively.

17. A method as described in claim 16, wherein each of the plurality of retro-reflectors is spherical such that light emitted by the light source toward the plurality of retro-reflectors is reflected toward the light source.

18. A method as described in claim 15, wherein each of the sets of retro-reflectors is formed such that air flow is provided by spaces between the sets of retro-reflectors that are positioned at the different respective distances.

19. A method as described in claim 15, wherein at least two said retro-reflectors are:
formed to overlap such that at least two portions of the at least two said retro-reflectors are positioned at substantially similar distances from an axis defined by light that is output by the light source toward the image forming device; and
positioned at the different respective distances from the light source.

20. A method as described in claim 15, wherein the light source is positioned:
between the concave reflector and the plurality of retro-reflectors; and
between the concave reflector and the image forming device.

21. A method as described in claim 15, wherein the image forming device is selected from the group consisting of:
a digital micromirror device (DMD);
a grating light valve (GLV);
a liquid crystal on silicon (LCOS) device; and
a liquid crystal display (LCD).

22. A method as described in claim 15, wherein the retro-reflectors in each set are concave and have respectively different curvatures, one set to another.

23. A method as described in claim 15, wherein the plurality of retro-reflectors reflect light emitted by the light source toward the concave reflector that is not first reflected by the concave reflector toward the image forming device.

24. A projector formed by the method of claim 15.

25. A projector comprising:
means for emitting light;
means for forming an image;
first means for reflecting that is:
concave; and
positioned to reflect light emitted by the light emitting means toward the image forming means; and
second and third means for reflecting that are:
configured to reflect light emitted from the light emitting means toward the first reflecting means; and
positioned spaced apart from the first means for reflecting and at different respective distances from the light emitting means.

* * * * *